(12) United States Patent
Capriotti

(10) Patent No.: US 11,261,837 B1
(45) Date of Patent: Mar. 1, 2022

(54) PULL START ASSIST DEVICE

(71) Applicant: Chris Capriotti, Clovis, CA (US)

(72) Inventor: Chris Capriotti, Clovis, CA (US)

( * ) Notice: Subject to any disclaimer, the term of this patent is extended or adjusted under 35 U.S.C. 154(b) by 0 days.

(21) Appl. No.: 17/188,054

(22) Filed: Mar. 1, 2021

(51) Int. Cl.
*F02N 3/04* (2006.01)
*F16H 21/44* (2006.01)
*F02N 15/00* (2006.01)
*F02N 11/12* (2006.01)

(52) U.S. Cl.
CPC .............. *F02N 3/04* (2013.01); *F02N 11/12* (2013.01); *F02N 15/006* (2013.01); *F16H 21/44* (2013.01)

(58) Field of Classification Search
CPC .................................. F02N 3/04; F02N 11/12
USPC ...................................................... 123/185.4
See application file for complete search history.

(56) References Cited

U.S. PATENT DOCUMENTS

| | | | | |
|---|---|---|---|---|
| 1,339,411 A * | 5/1920 | Odier | ........................ | F02N 7/02 74/140 |
| 1,375,472 A * | 4/1921 | Simpson | .................... | F02N 3/04 74/57 |
| 2,850,003 A * | 9/1958 | Konle | ................. | A01D 34/6818 123/185.2 |
| 3,018,768 A * | 1/1962 | Thompson | ................. | F02N 3/04 123/185.2 |
| 3,381,677 A * | 5/1968 | Hunter | ...................... | F02N 3/04 123/185.14 |
| 3,626,937 A * | 12/1971 | Gjovik | ....................... | F02N 3/04 123/185.2 |
| 3,782,356 A * | 1/1974 | Hamman | ................... | F02N 3/04 123/185.5 |
| 3,857,377 A * | 12/1974 | Christensen | .............. | F02N 3/04 123/185.4 |
| 4,109,538 A * | 8/1978 | Glenday | ................... | F02N 3/02 123/185.2 |
| 4,397,274 A * | 8/1983 | Tarnedde | ........... | A01D 34/6818 123/185.2 |
| 5,070,828 A * | 12/1991 | Chestnutt | .................. | F02N 3/04 123/185.4 |
| 5,133,312 A * | 7/1992 | Schede | ...................... | F02N 3/02 123/185.2 |
| D330,557 S * | 10/1992 | Smith | ........................... | D15/17 |
| 5,174,166 A * | 12/1992 | Tryon | ....................... | F02N 3/02 74/140 |
| 5,253,540 A * | 10/1993 | Sanders | ..................... | F02N 3/02 123/185.4 |
| 5,285,693 A * | 2/1994 | Sanders | ..................... | F02N 3/02 123/179.25 |
| 5,630,388 A * | 5/1997 | Eaton | ......................... | F02N 3/04 123/185.4 |

(Continued)

*Primary Examiner* — Kevin R Steckbauer

(57) ABSTRACT

A pull start assist device may include a frame with a base and a longitudinal member. The longitudinal member may include a first pivot axis and a second pivot axis displaced from the first pivot axis. The device may also include a pedal arm with a pedal on a first end and a second end pivotally coupled to the first pivot axis of the longitudinal member. A swing arm may be provided with a handle receiver on a first end and a second end pivotally coupled to the second pivot axis of the longitudinal member. A connection link maybe used to connect the swing arm and the pedal arm, whereby a pull start handle of a powered tool may be supported by the handle receiver and the pedal displaced by the foot of a user, actuating the swing arm and starting the powered tool.

20 Claims, 13 Drawing Sheets

(56) References Cited

U.S. PATENT DOCUMENTS

| | | | | |
|---|---|---|---|---|
| 5,762,037 | A * | 6/1998 | Rothrock | F02N 3/04 |
| | | | | 123/185.4 |
| 6,000,291 | A * | 12/1999 | Swift | F02N 11/12 |
| | | | | 123/179.1 |
| 6,244,233 | B1 * | 6/2001 | Tryon | F02N 3/02 |
| | | | | 123/185.3 |
| 6,321,709 | B1 * | 11/2001 | Lyon | A01D 34/6818 |
| | | | | 123/185.4 |
| 6,497,210 | B1 * | 12/2002 | Kattenhorn | F02N 3/02 |
| | | | | 123/185.4 |
| 6,915,773 | B2 * | 7/2005 | Smith | F02N 3/02 |
| | | | | 123/179.26 |
| 7,322,334 | B1 * | 1/2008 | O'Brien | B27B 17/00 |
| | | | | 123/185.4 |
| 8,539,925 | B2 * | 9/2013 | Gleason | F02N 7/02 |
| | | | | 123/185.3 |
| 9,714,637 | B1 * | 7/2017 | Stacey | F02N 3/02 |
| 9,745,939 | B1 * | 8/2017 | Rzepka | B27B 17/00 |
| 10,047,715 | B2 * | 8/2018 | Brankin | A01D 34/6818 |
| 2005/0229892 | A1 * | 10/2005 | Evans | F02N 5/02 |
| | | | | 123/185.14 |
| 2008/0078350 | A1 * | 4/2008 | Wang | F02N 3/04 |
| | | | | 123/185.4 |
| 2014/0000546 | A1 * | 1/2014 | Hardy | F02N 3/02 |
| | | | | 123/185.4 |
| 2015/0136059 | A1 * | 5/2015 | Mulligan | F02N 3/04 |
| | | | | 123/185.1 |

* cited by examiner

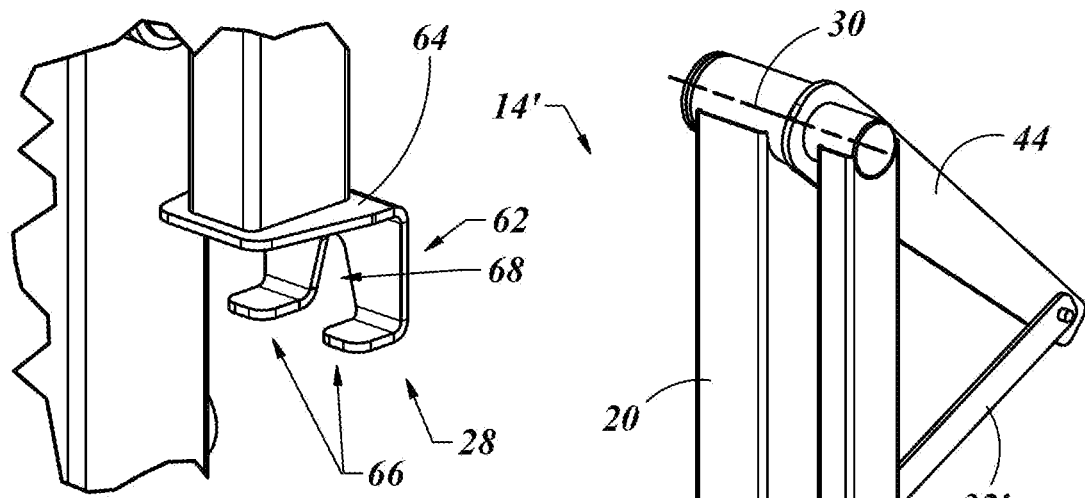
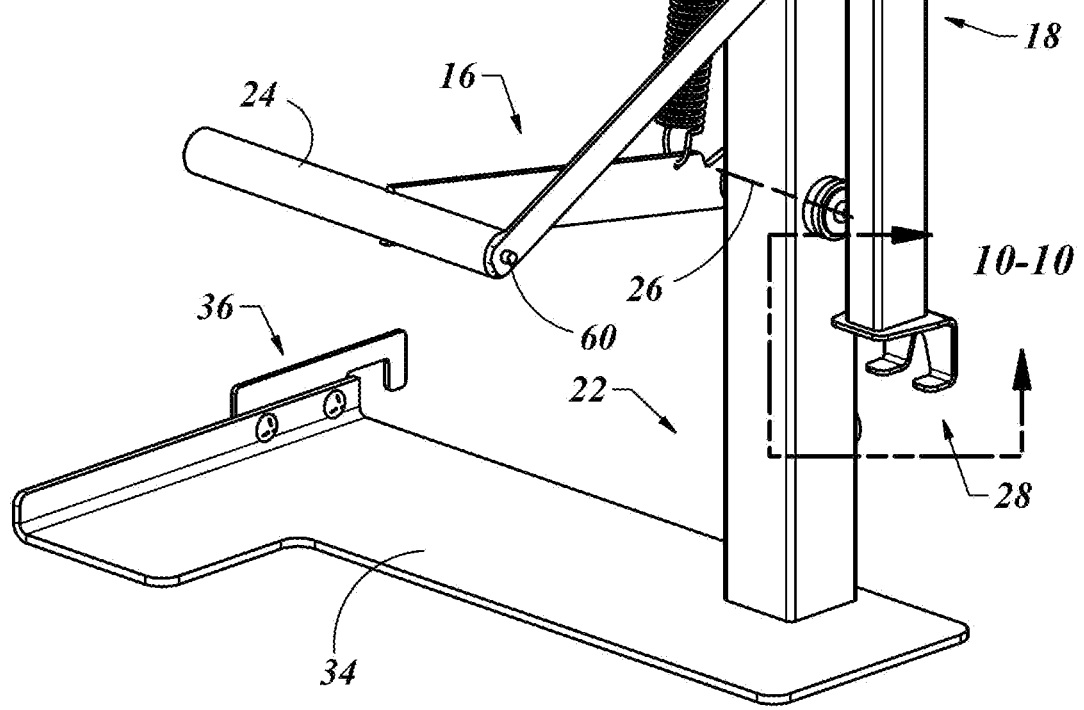
Fig. 10
Fig. 9

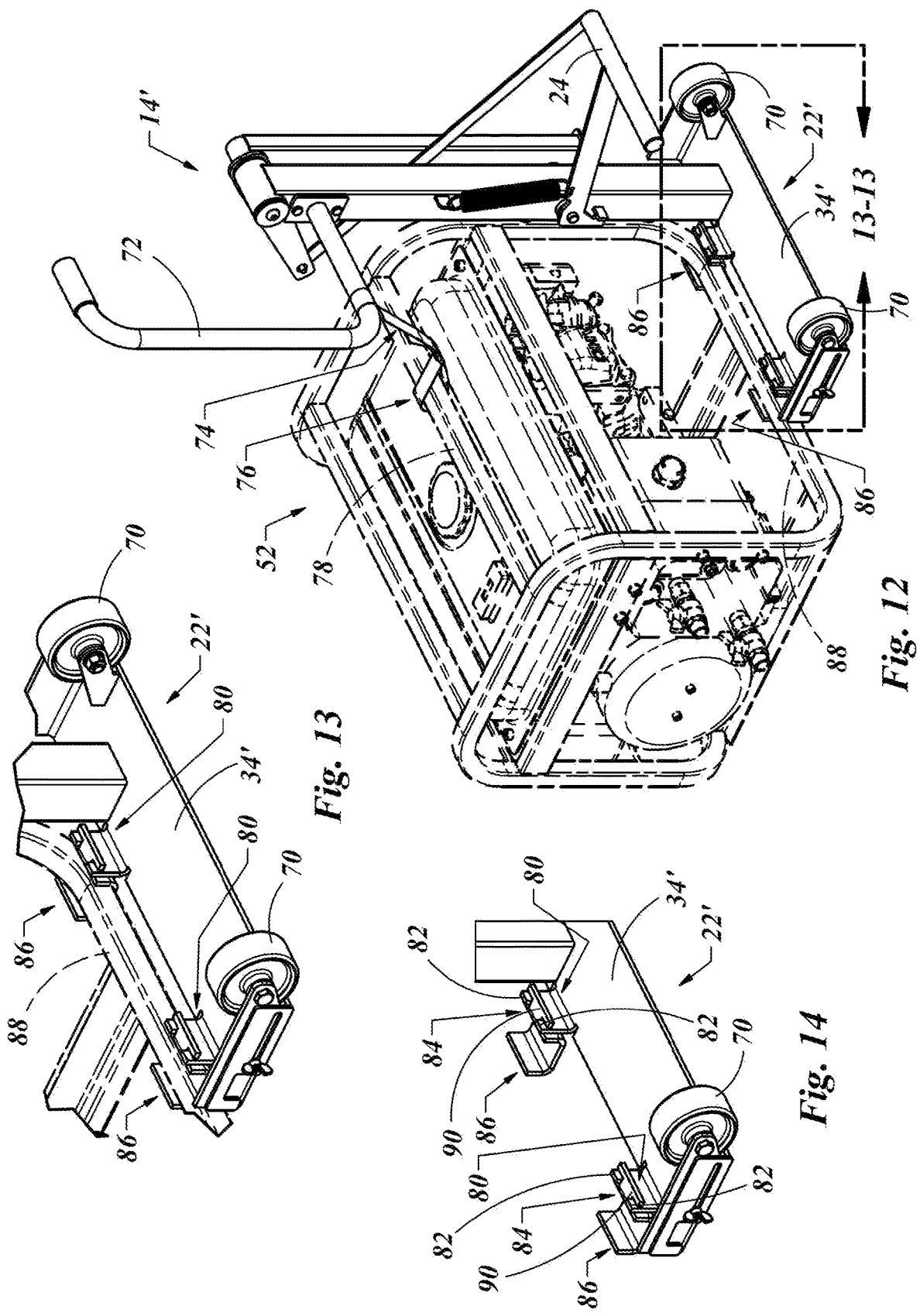

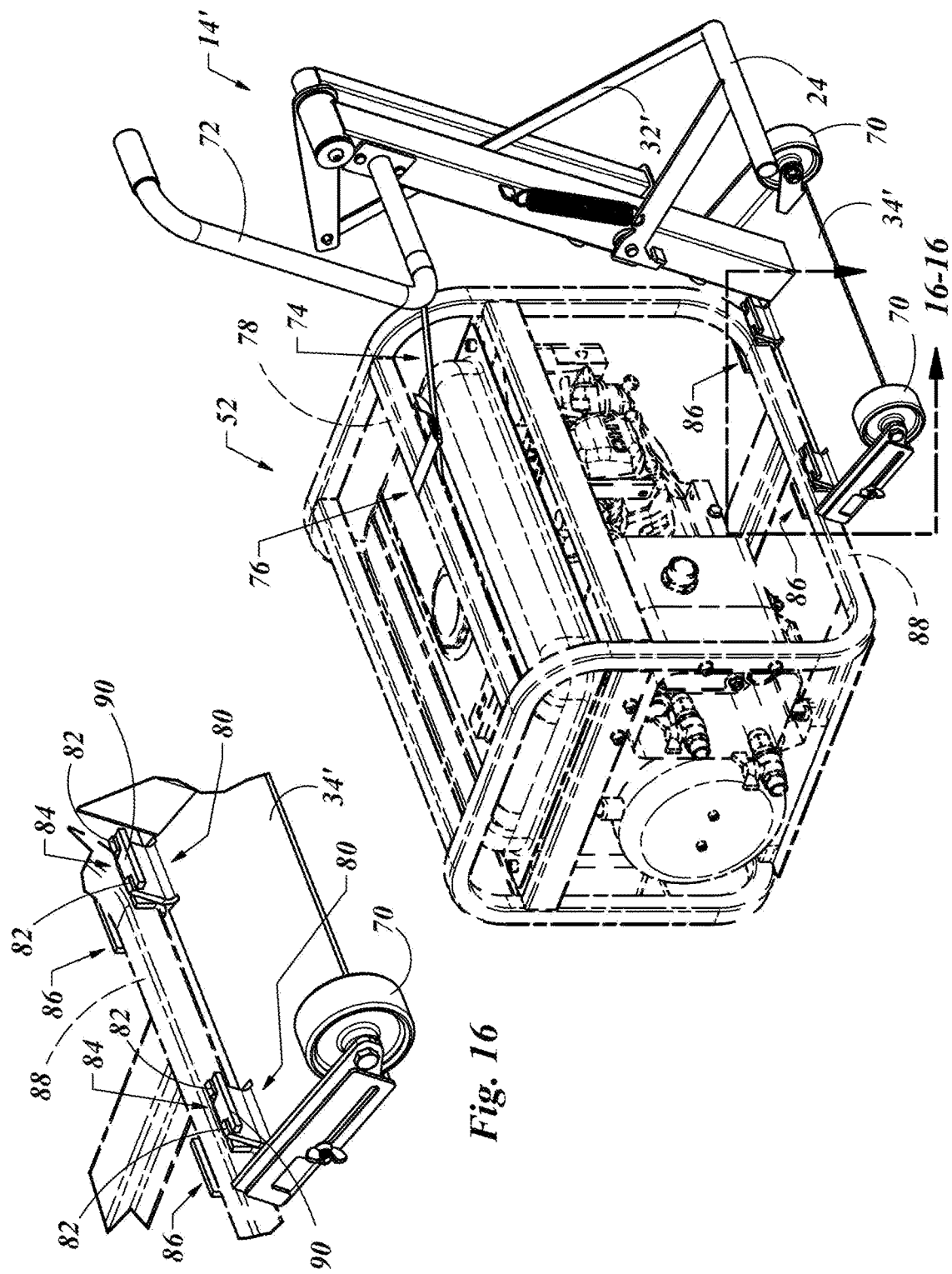

PULL START ASSIST DEVICE

FIELD OF THE INVENTION

The present invention generally relates to power tools and more specifically to devices which assist in starting power tools which use a pull start.

BACKGROUND OF THE INVENTION

A series of power tools use a pull start to turn over and start the operation of the engine which then powers the tool. This power tool may include many lawn mowers, chainsaws, weed trimmers, outboard marine motors and portable generators. The use of a pull start may be commonly used in portable power tools like those mentioned, in that a power start may require a starter motor and a power supply, such as a battery, that is used only to start the engine on the power tool and after that it is dead weight that the user must carry in the operation of the power tool. The power start may also add additional cost to the power tool. When the engine on the power tool or other device is too large to start by the muscular power of one arm of an average person, such as an automobile, power starters are effectively used. With smaller engines, typically under 20 Hp, a pull start is at least an option, and under around 10 Hp, virtually all engines use the pull start exclusively.

The problem is the pull start is very specific and requires a set output of muscular power from one arm and one shoulder in order to start the engine so that the tool may be used for its intended purpose. The tool has no value to the user if the engine does not start. Some women may not have the physical upper body strength to start a portable generator in a power outage. Under certain conditions, this may be life threatening. Even for someone who has the physical strength, if the person has an injury to their hand, arm, shoulder or back, the pull start may not be an option for them to use. To overcome this problem, a device has been created that uses the much stronger and more powerful muscles of the lower body. This pull start assist device engages with the typical pull start so the user has the option to use the existing pull start with their arm, or convert the pull start to a kick start, using the leg and hip muscles to start the engine.

It should, therefore, be appreciated that there is a need for a device which has the capability of transforming a standard pull start into a kick start, thereby enabling the use of the more powerful muscles of the lower body to start an engine. The present invention fulfills this need and others.

SUMMARY OF THE INVENTION

The present invention may include a frame with a base and a longitudinal member, the longitudinal member may include a first pivot axis and a second pivot axis displaced from the first pivot axis. A pedal arm may have a pedal on a first end and a second end may be pivotally coupled to the first pivot axis of the longitudinal member. A swing arm may have a handle receiver on a first end and a second end may be pivotally coupled to the second pivot axis of the longitudinal member. A connection link may connect the swing arm and the pedal arm, whereby movement of the pedal of the pedal arm of a set displacement may cause a greater displacement of the handle receiver of the swing arm. The combination may be referred to as a pull start assist device.

The base of the frame may include a substantially flat portion suitable for a user to stand on. A support bracket may be movably coupled to the base. The support bracket may include a receiver notch, which may be used to engage a frame of a power tool so as to secure the pull start assist device to the power tool. A return spring may be coupled to the frame and the pedal arm, whereby if the pedal arm is moved, the return spring may return the pedal arm to a starting position.

The pedal arm may further comprise a pedal extension arm rigidly secured to the pedal arm, such that movement of the pedal arm may provide a similar rotational movement of the pedal extension arm. The connection link of the pull start assist device may be coupled to the pedal extension arm of the pedal arm. The swing arm may be comprised a swing extension arm rigidly secured to the swing arm, such that movement of the swing arm provides a similar rotational movement of the swing extension arm. In this case, the connection link may be coupled to the swing extension arm of the swing arm.

The handle receiver may include a divided flat section with a flange on two sides of the divided flat section. This configuration may assist in holding a handle of the pull start assembly. The frame may also include at least one wheel rotateably coupled to the base. The base of the frame may further comprise at least one hinge base, wherein the at least one hinge base may include two front flanges with an open area between the two front flanges. A hinge plate may also be provided that may include a stop tab, a portion of the stop tab may be positioned in the open area between the two front flanges and the stop tab may contact the two front flanges at a determined angular displacement of the hinge plate relative to the hinge base. A support strap may be coupled to the frame, wherein the support strap may include a first end coupled to a handle arm of the frame and a second end with a receiver, the receiver may provide a secured support of a frame of a power tool.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which:

FIG. 9 is an isometric view of an alternative design of the pull start assist device of FIG. 1.

FIG. 10 is a detail view of the end of the swing arm of FIG. 9, cut along line 10-10.

FIG. 12 is an isometric view of an alternative embodiment of the pull start assist device of FIG. 1, here including a handle, wheels and a hinge plate adapted to receive a frame of the power tool.

FIG. 13 is a detailed view of a lower portion of the pull start assist device of FIG. 12, cut along line 13-13.

FIG. 14 is an isometric view of a hinge plate and hinge base combination as presented in FIG. 13.

FIG. 15 is a isometric view of the pull start assist device and power tool of FIG. 12 shown with the power tool in an inclined position relative to the partially rotated pull start assist device.

FIG. 16 is a detailed view of the lower portion of the pull start assist device of FIG. 15 cut along line 16-16.

DETAILED DESCRIPTION OF THE INVENTION

Figure 1:
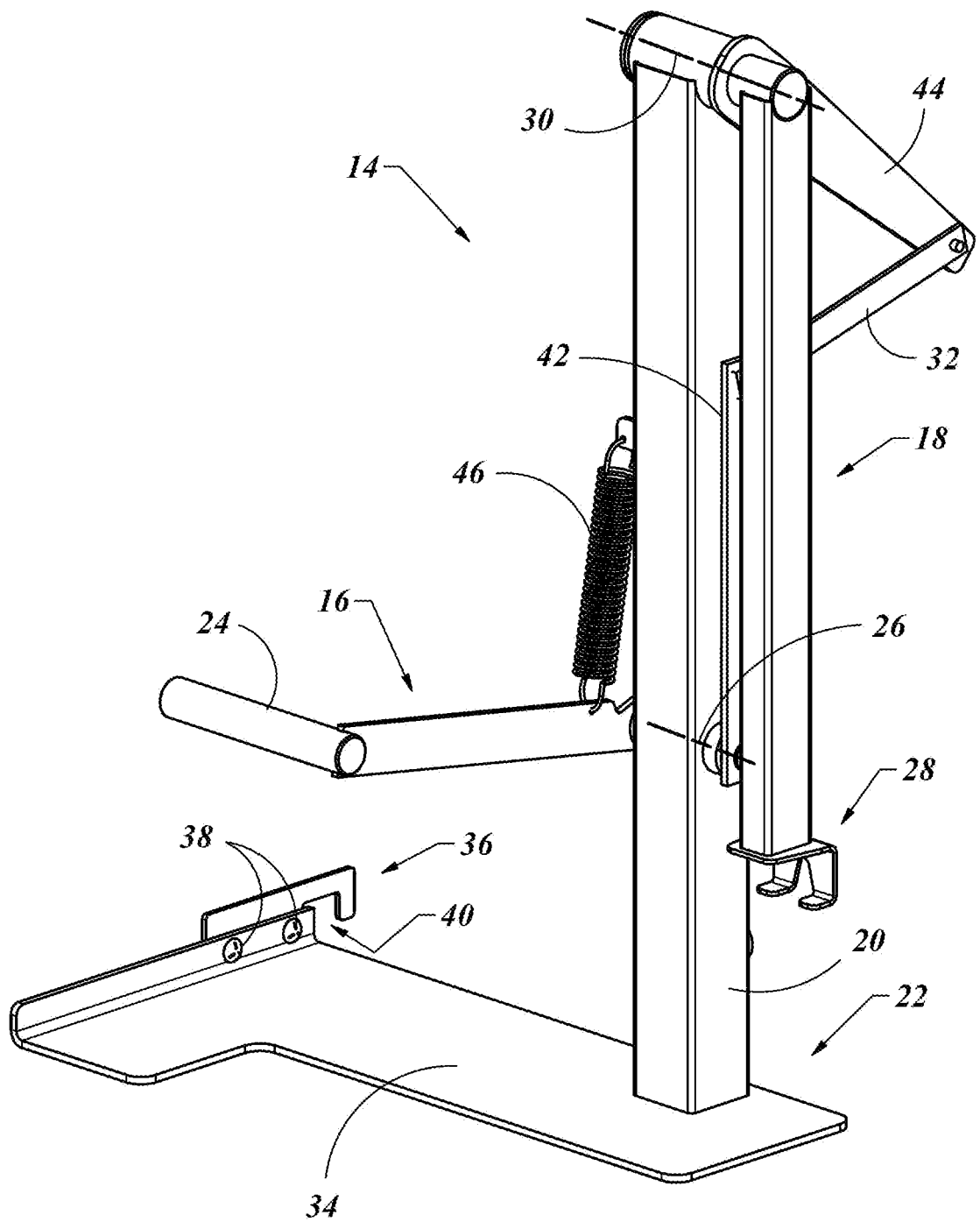
FIG. 1 is an isometric view of a pull start assist device, presented in accordance with the present invention.
Figure 2:
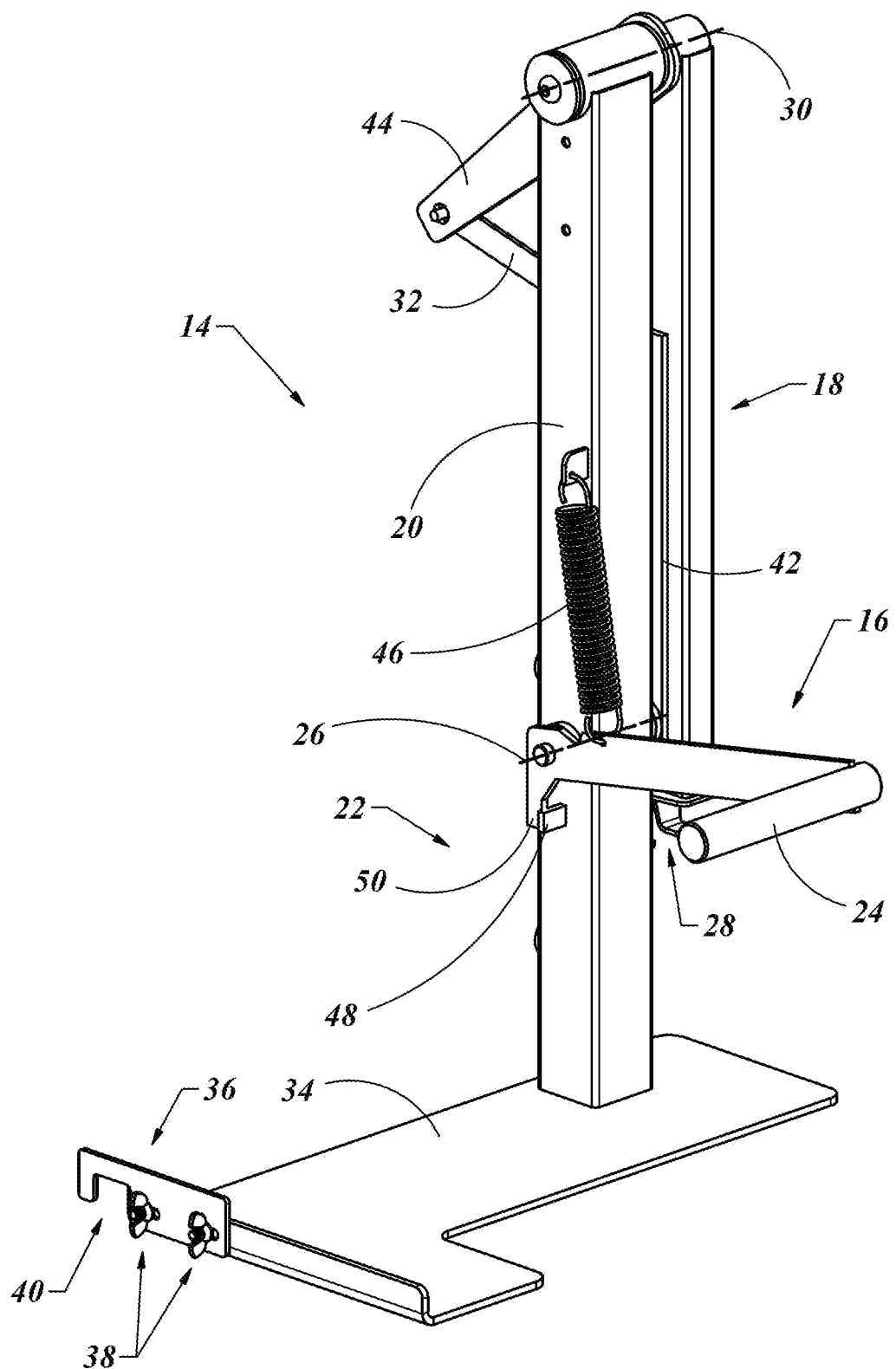
FIG. 2 is an isometric view of the pull start assist device of FIG. 1, shown from a partially left view.

With reference to the illustrative drawings and particularly to FIGS. 1-2, there is shown a pull start assist device 14 which may include a pedal arm 16 and a swing arm 18 pivotally coupled to a longitudinal member 20 of a frame 22. The pedal arm 16 may include a pedal 24 attached to a first end of the pedal arm 16 and a second end pivotally coupled to the longitudinal member 20 of the frame 22 at a first pivot axis 26. In a similar manner, the swing arm 18 may include a handle receiver 28 on a first end of the swing arm 18 and a second end of the swing arm may be pivotally coupled to the longitudinal member 20 of the frame 22 at a second pivot axis 30. The first pivot axis 26 may be displaced from the second pivot axis 30. A connection link 32 may be used to mechanically couple the pedal arm 16 to the swing arm 18, such that movement of the pedal arm 16 causes movement of the swing arm 18.

The frame 22 may also include a base 34, which may be securely coupled to the longitudinal member 20. The base 34 may include a flat portion that may be suitable for a user to position a portion of their foot on, thus using the body weight of the user to secure the pull start assist device 14 in place. To further assist in securing the pull start assist device 14, a support bracket 36 may be movably coupled to the base 34 by way of one or more screws 38. The support bracket 36 may include a receiver notch 40. The receiver notch 40 may receive a portion of a frame of a power tool or other device. The location of the receiver notch 40 may be adjusted by loosening the screws 38, moving the support bracket 36 to the desired position and then tightening the screws 38.

In a preferred embodiment, the linear displacement between the pedal 24 in a starting position (as shown) to a lowered position, such as after a user would step on the pedal 24, and rotating the pedal arm 16 down toward the base 34 of the frame 22, would be less than the linear distance of the handle receiver 28 from a starting position to an extended position, caused by movement of the pedal 24. This is illustrated in later drawings. The displacement of the pedal 24 of the pedal arm 16 relative to the displacement of the handle receiver 28 of the swing arm 18 may be a function of the distance from the pedal 24 to the first axis 26, the distance from the handle receiver 28 to the second axis 30 and the length and connection points of the connection link 32 to the pedal arm 16 and the swing arm 18. In this embodiment, the pedal arm 16 may include a pedal extension arm 42, which may be rigidly coupled to the pedal arm 16, whereby rotation of the pedal arm 16 results in a similar rotation of the pedal extension arm 42. Similarly, the swing arm 18 may include a swing extension arm 44, in which rotation of the swing arm 18 results in a similar rotation of the swing extension arm 44. The use of the pedal extension arm 42 and the swing extension arm 44 are not critical to the function of the pull start assist device 14, as these are eliminated in an alternative embodiment of the invention 14. The pedal extension arm 42 and the swing extension arm 44 may be useful in that the length of the connection link 32 may be reduced by the use of the pedal extension arm 42 and the swing extension arm 44. Also, a greater versatility in the geometric lever lengths of the links may be found with using the pedal extension arm 42 and the swing extension arm 44. Finally, the use of the pedal extension arm 42 and swing extension arm 44 may offer a smaller knocked down (partially disassembled) volume of the device 14, thus saving in shipping and storage costs as opposed to directly connecting the swing arm 18 to the pedal arm 16 by way of the connection link 32.

A return spring 46 may be coupled to the pedal arm 16 and the frame 22, such that when a user presses down on the pedal 24 of the pedal arm 16, the return spring 46 may bias the pedal arm 16 back up after the user releases the pedal 24, thus positioning it ready for another actuation of the pedal arm 16. A stop 48 may be secured to the frame 22, which may contact an arm tab 50 on the pedal arm 16. This may ensure a consistent and defined top position of the pedal arm 16 relative to the frame 22.

Figure 3:
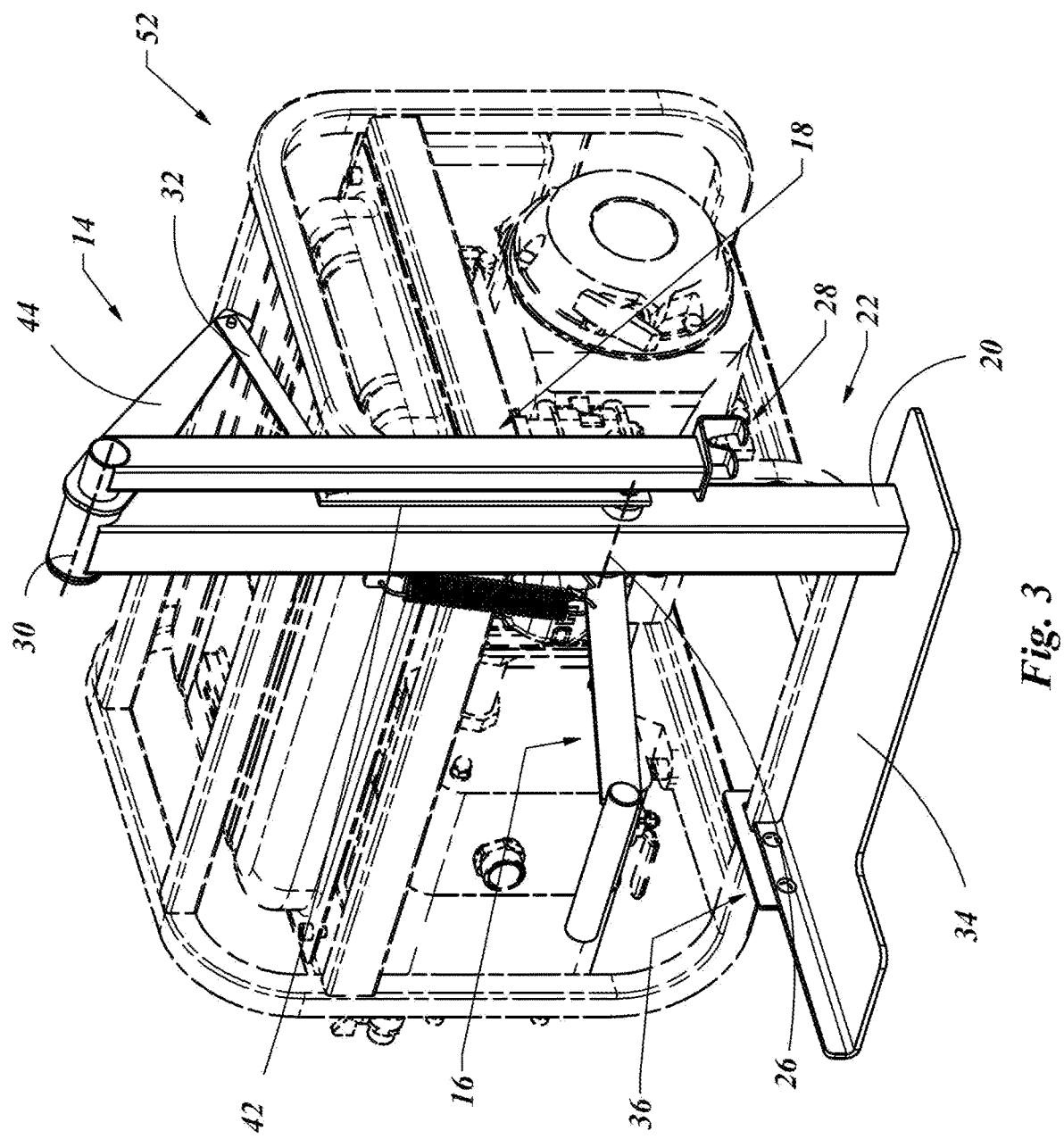
FIG. 3 is an isometric view of the pull start assist device as presented in FIG. 1, positioned next to a power tool in the form of a portable generator.
Figure 4:
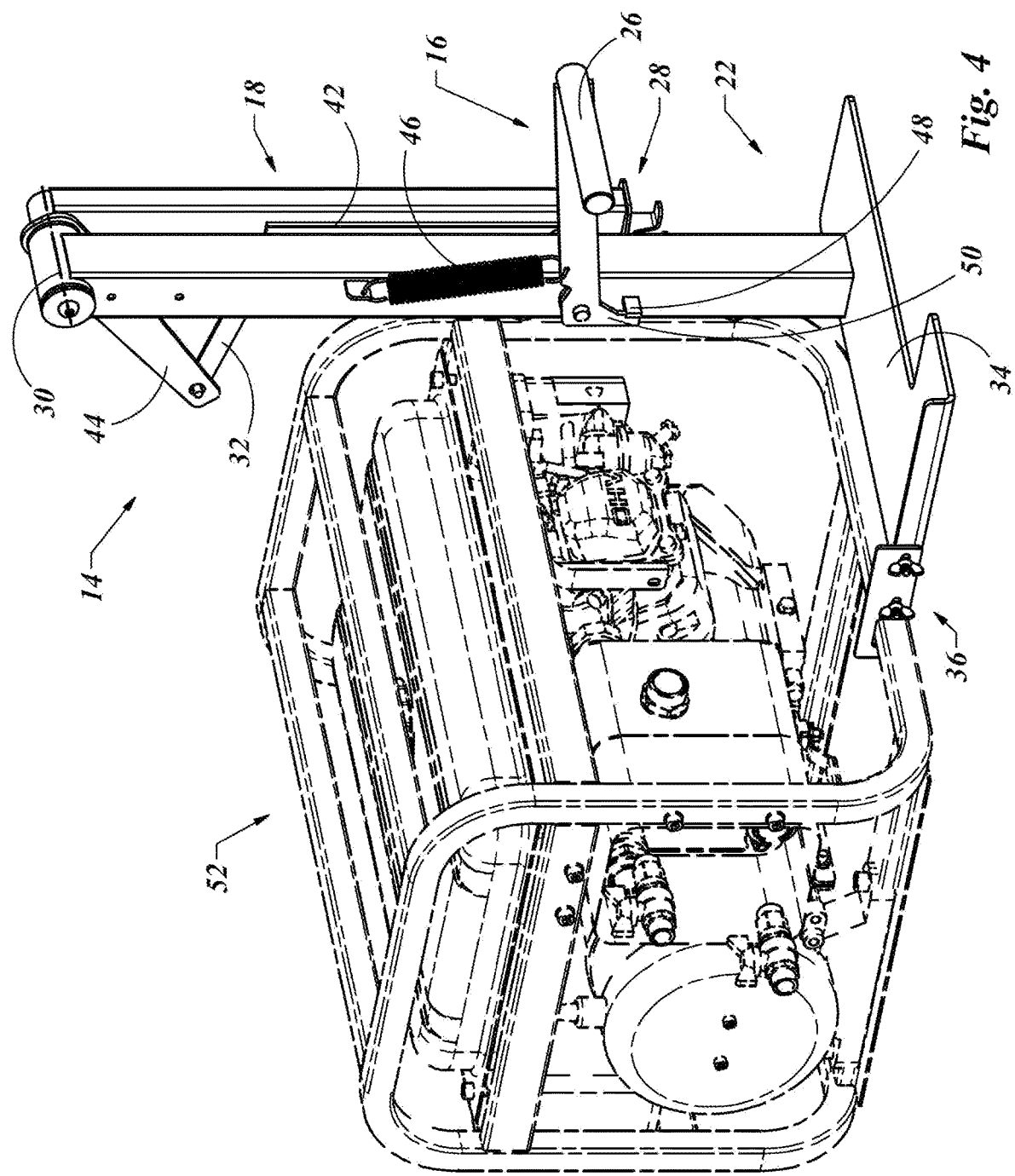
FIG. 4 is an isometric view of the pull start assist device and portable generator on FIG. 3, shown from a partially left view.
Figure 5:
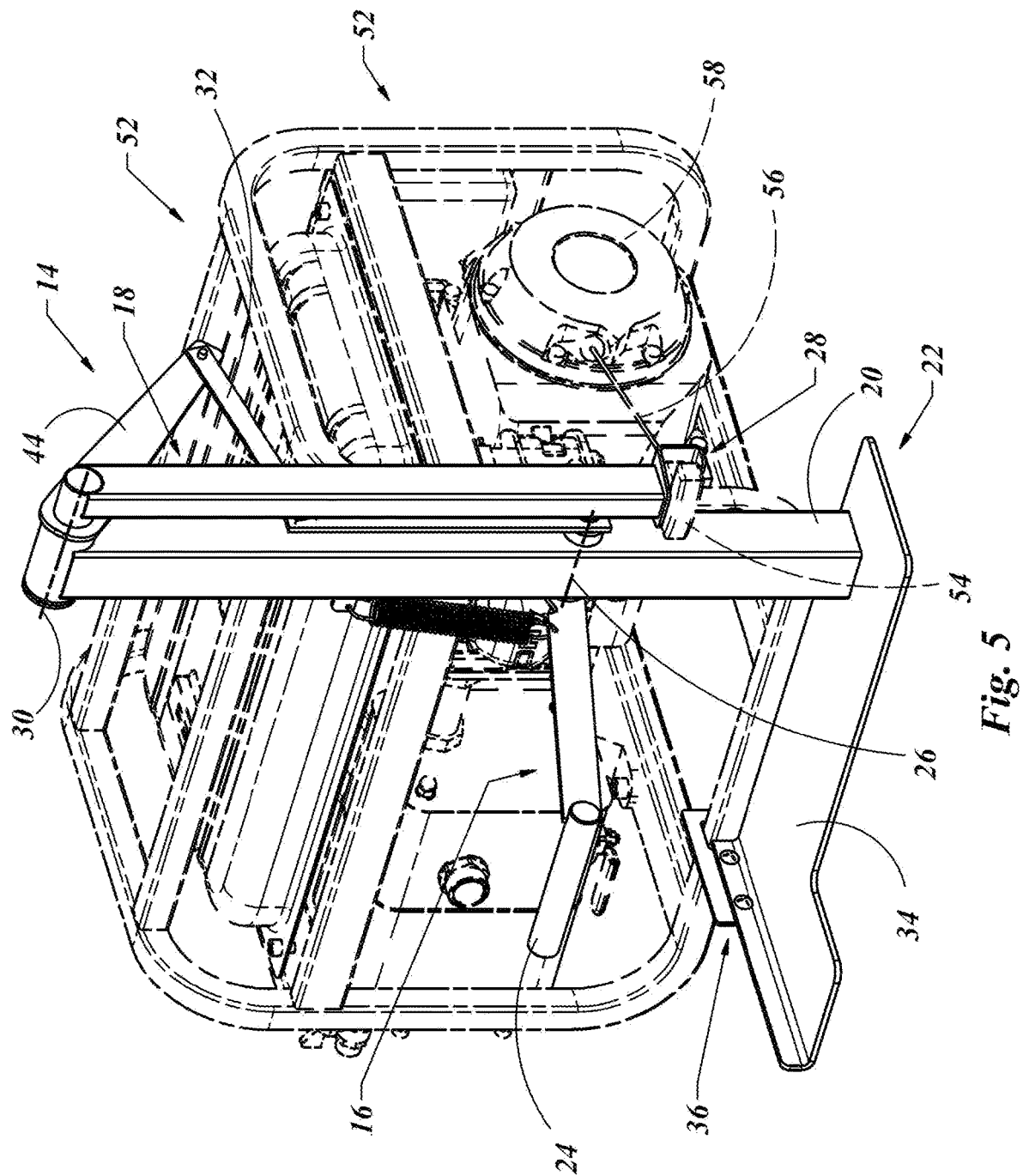
FIG. 5 is an isometric view of the pull start assist device and portable generator of FIG. 3, with the handle of the generator received by the handle receiver of the pull start assist device in a starting position.
Figure 6:
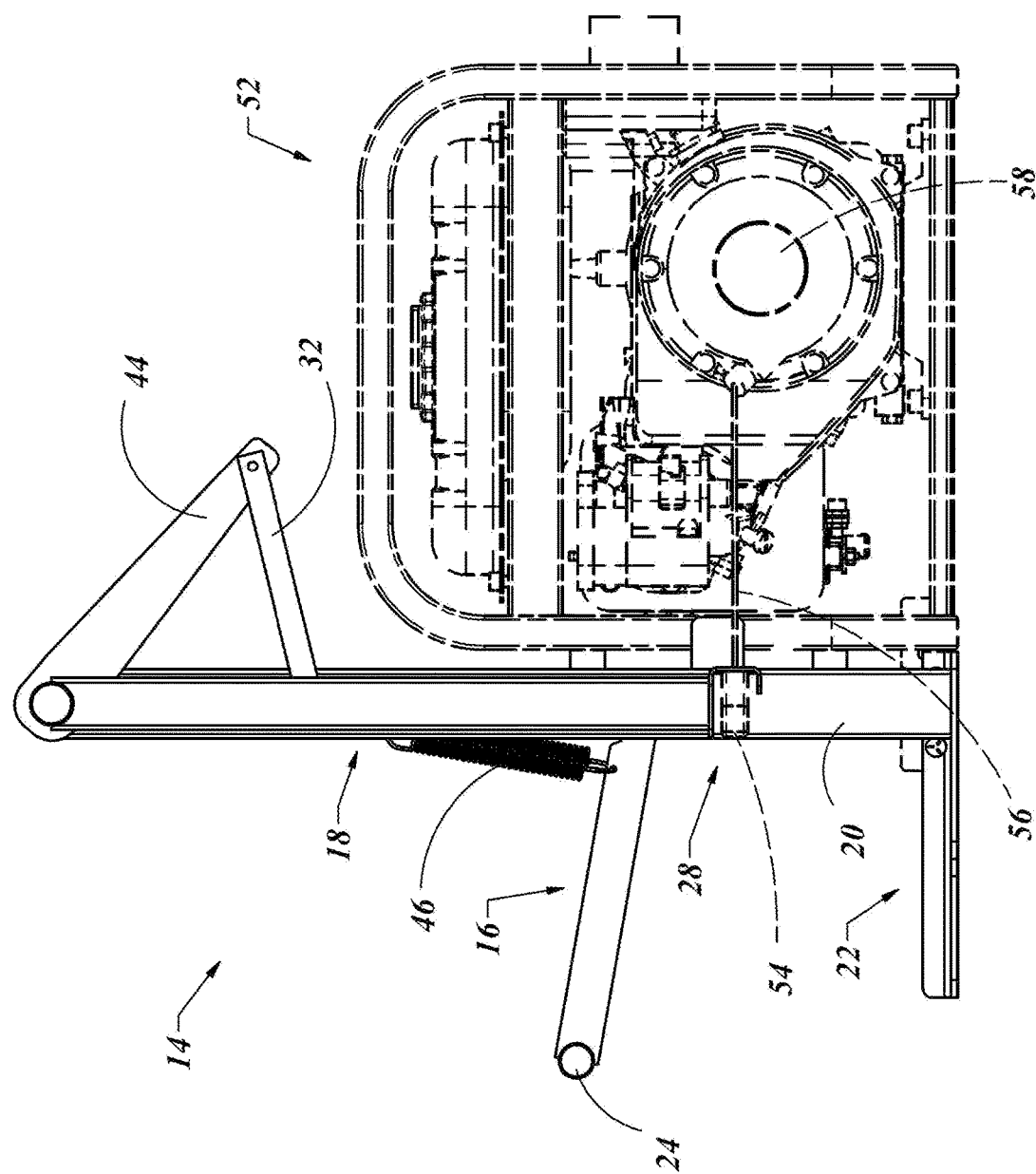
FIG. 6 is a side view of the pull start assist device and the portable generator as presented in FIG. 5.

A typical use of the pull start assist device 14 is illustrated in FIGS. 3-10. In FIG. 3 and FIG. 4 the pull start assist device 14 is positioned adjacent to a power tool 52, in this case the power tool 52 is in the form of a portable generator. In FIG. 5 and FIG. 6 the pull start handle 54 of the power tool 52 is received by the handle receiver 28 of the swing arm 18 of the pull start assist device 14. In these figures, the pull cord 56 is extended slightly from the drum 58, but the swing arm 18 is maintained in a starting position.

Figure 7:
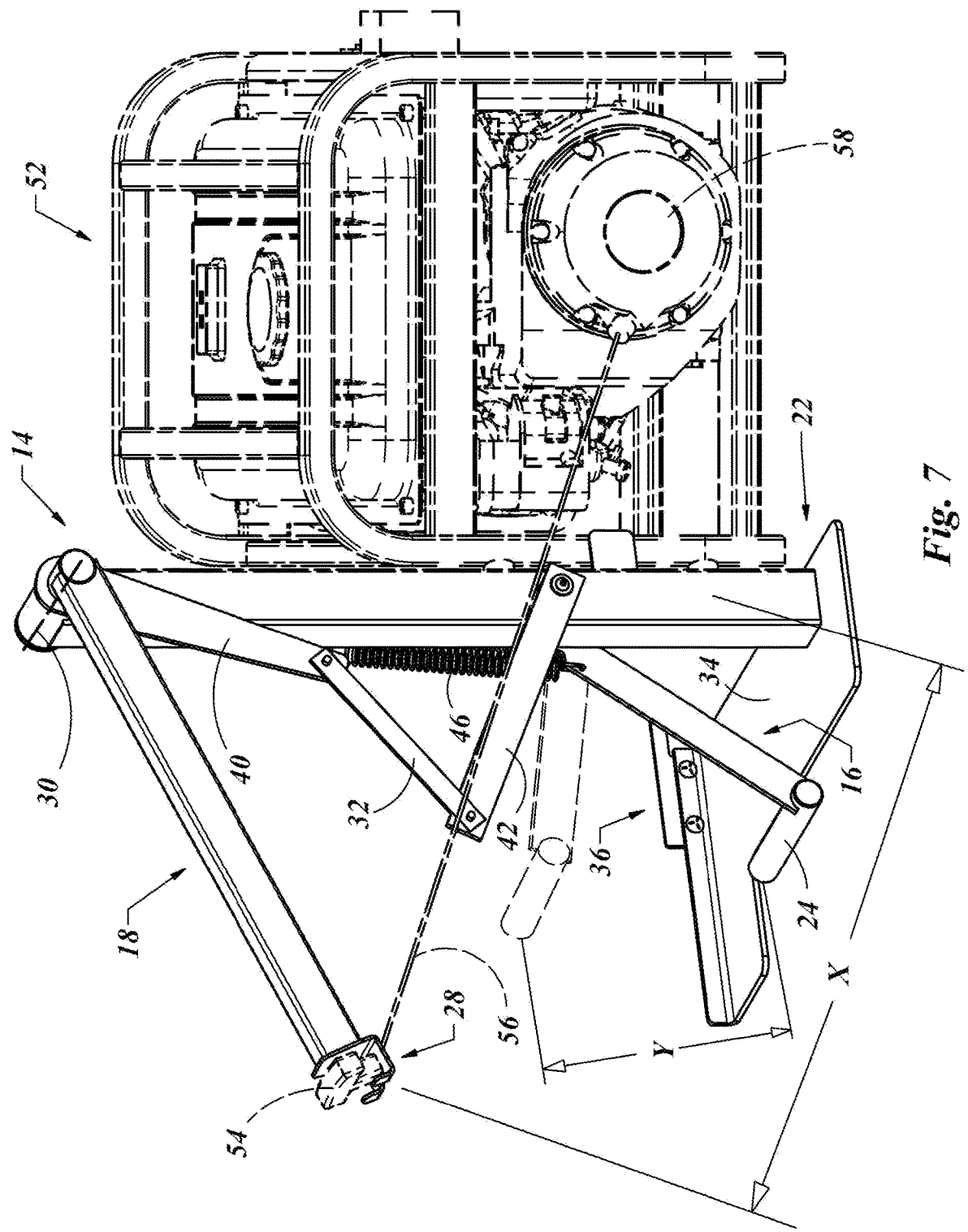
FIG. 7 is an isometric view of the pull start assist device and portable generator of FIG. 5, with the pull start assist device in a swing arm extended position, with the pull start handle displaced from the body of the portable generator.
Figure 8:
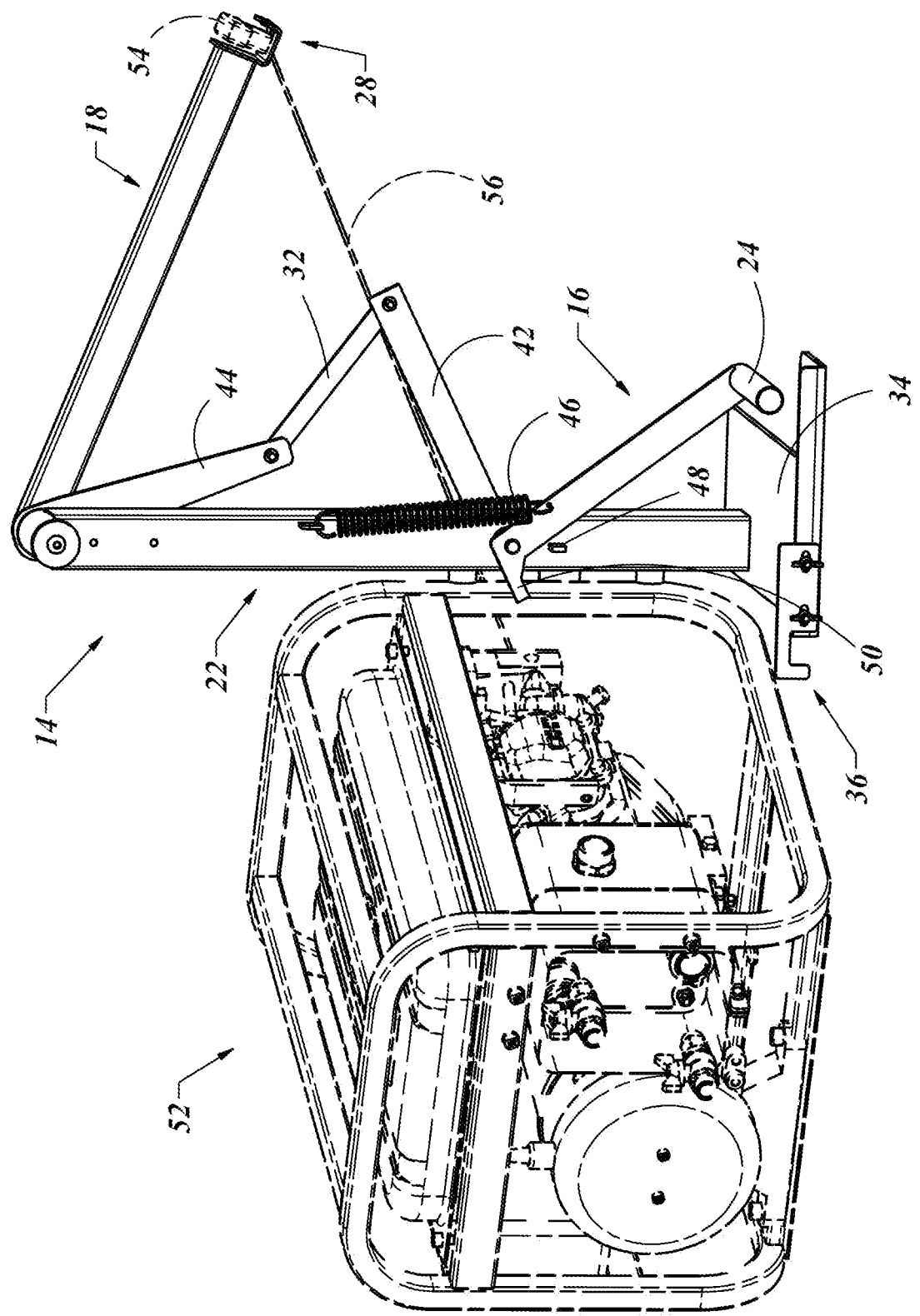
FIG. 8 is a left isometric view of the pull start assist device and the portable generator with the pull start handle displaced form the body of the generator, as presented in FIG. 7 only shown from a partially left view.

In FIG. 7 and FIG. 8 the pedal 24 of the pedal arm 16 is lowered to a position near the base 34 of the frame 22. This rotates the pedal extension arm 42 in a similar manner to the pedal arm 16. The movement of the pedal arm 16 causes the rearward rotation of the swing arm 18 by way of the connection arm 32 coupled to the pedal extension arm 42 of the pedal arm 16 and the swing extension arm 44 of the swing arm 18. The result is the pull start handle 54 is extended from the drum 58, thereby extending the pull cord 56. This extension of the pull cord 56 is how a power tool 52 with a pull start engine is started. Instead of the user relying on the muscles of one arm to pull, and bent over at that, the user can stand upright, place their left foot on the base 34 of the frame 22, then position their right foot on the pedal 24, shift their weight to the right and press down with their right foot. This now uses the weight of the user and the larger and more powerful muscles of the leg and hip to pull the pull start handle 54 and start the engine of the power tool 52. When the engine is started, the user can remove the pull start handle 54 from the handle receiver 28, and then move the pull start assist device 14 away from the power tool 52.

FIG. 7 further illustrates the displacement of the pedal 24 of the pedal arm 16 in relation to the displacement of the handle receiver 28 of the swing arm 18. The displacement of the handle receiver 28 of the swing arm 18 from the starting position to an extended position is designated by the dimension "X". The corresponding displacement of the pedal 24 of the pedal arm 16 from the starting position to a final or lower position, such as would result from a user pressing down on the pedal 24, is designated by the dimension "Y". In this embodiment the value of "X" may be desired to be greater than the value of "Y". In other words, the displacement of the handle receiver 28 may be greater than the displacement of the handle 24 from the starting position to the extended position of each. This may be due to a variety of details, including the power output of a user's leg and shifting body weight with movement over a relatively short distance (Y) may be great enough to drive the pull start handle 54, secured in the handle receiver 28, a longer distance (X) as may be desired to start the engine of the power tool 52.

Figure 11:
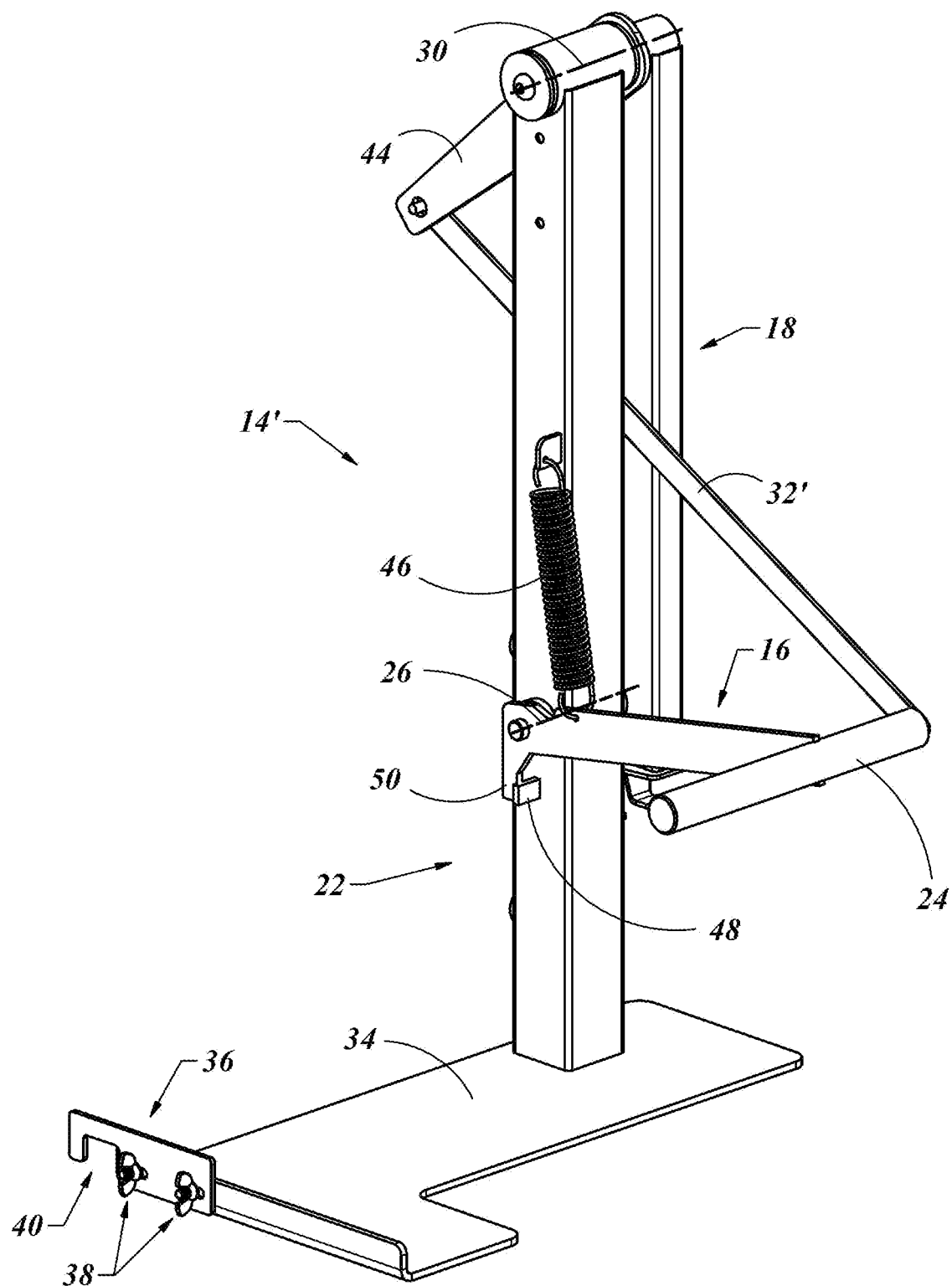
FIG. 11 is an isometric view of the pull start assist device of FIG. 9, shown from a partially left view.

Referring to FIG. 9 and FIG. 11, an alternative embodiment of the pull start assist device 14' is shown. In this embodiment elements and functions of the swing arm 18, coupled to the frame 22 at the second pivot axis 30, and a pedal arm 16 coupled to the frame 22 at the first axis 26, may be similar or the same as, that as previously disclosed. The swing arm 18 may still include a swing extension arm 44, as previously presented. The difference may be in the connection link 32', which as shown here, may be directly connected to the pedal 24 of the pedal arm 16 at a pedal pivot 60. In this embodiment the pedal extension arm from the previous embodiment has been eliminated. There may be advantages to either embodiment and one is not presented here as always being preferable over the other.

Referring to FIG. 10, a detail of the handle receiver 28 is shown. The function of the handle receiver 28 is to support the pull start handle 54 from a starting position, in this embodiment where the swing arm 18 is in a vertical position, to an extended position, as shown in FIGS. 7-8. The pull start handle 54 may be connected to the drum 58 by the pull cord 56. The drum 58 may contain a spring (not shown) which enables the pull cord 56 to recoil on a spool inside of the drum 58. This provides a gentle tension to the pull cord 56 to bias the pull start handle 54 toward the drum 58. The tension in the pull cord 56 provided by the bias may help secure the pull start handle 54 in the handle receiver 28.

The detail shown in FIG. 10 shows the handle receiver 28 with a divided flat section 62 and a first flange 64 and a second flange 66. The divided flat section 62 may include a void 68 thereby separating the divided flat section 62 into two parts. This void 68 may be used to allow the pull cord 56 to pass between the two sections of the divided flat section 62 while still offering support for the pull start handle 54. The pull start handle 54 may be further supported by the first flange 64 and the second flange 66 each on one side of the divided flat section 62. The first flange 64 and the second flange 66 may capture the top and bottom of the pull start handle 54 in the starting position of the swing arm 18 through to the extended position of the swing arm 18. The first flange 64 may be secured to a distal end of the swing arm 18.

Referring to FIG. 12-FIG. 14, an alternative base 34' is shown to be part of an alternative frame 22'. The alternative base 34' of the alternative frame 22' may include one or more wheels 70, which may be rotatably coupled to the alternative base 34'. The alternative frame 22' may also include a handle arm 72, which may be releasably mounted to the rest of the frame 22'. A support strap 74 may have a first end coupled to the handle arm 72 or any other portion of the frame 22'. The support strap 74 may have a receiver 76 on a second end of the support strap 74. The receiver 76 may be adapted to provide secured support of a portion of a frame 78 of the power tool 52. In this embodiment the support strap 74 may be made of a pliable material such as a woven cotton or nylon. This may be considered to be the preferred embodiment of the support strap 74. Other forms may also include two or more rigid bars that may be pivotally mounted one to the other such that the bars may fold together to provide a shorter distance between the handle arm 72 and the receiver 76 end of the support strap 74 which is coupled to the frame 78, and then unfolded to extend to provide a longer distance between the handle arm 72 and the receiver 76. This will become clearer in the following reading.

The alternative base 34' may also include one or more hinge bases 80. In this embodiment, two hinge bases 80 are shown, each positioned adjacent to one another. It is understood that one hinge base 80 or several hinge bases 80 could be used as needed to be part of the alternative base 34'. Each hinge base 80 may include at least two front flanges 82 with an open area 84 between the at least two front flanges 82. A hinge plate 86 may be adapted to support an additional frame member 88 of the power tool 52. FIG. 12 and FIG. 13 show at least a portion of the additional frame member 88 where FIG. 14 shows the detail of a portion of the alternative base 34' with the additional frame member 88 removed, so as to allow more detail of the hinge plate 86 to be shown. The hinge plate 86 may include a stop tab 90. A portion of the stop tab 90 of the hinge plate 86 may be received by the open area 84 of the hinge base 80, whereby a portion of the stop tab 90 may contact the two front flanges 82 at a determined position of the hinge plate 86 to the hinge base 80. This combination may allow for a limited angular displacement of the hinge plate 86 relative to the hinge base 80, while the hinge plate 86 is being supported by the hinge base 80.

Figure 17:
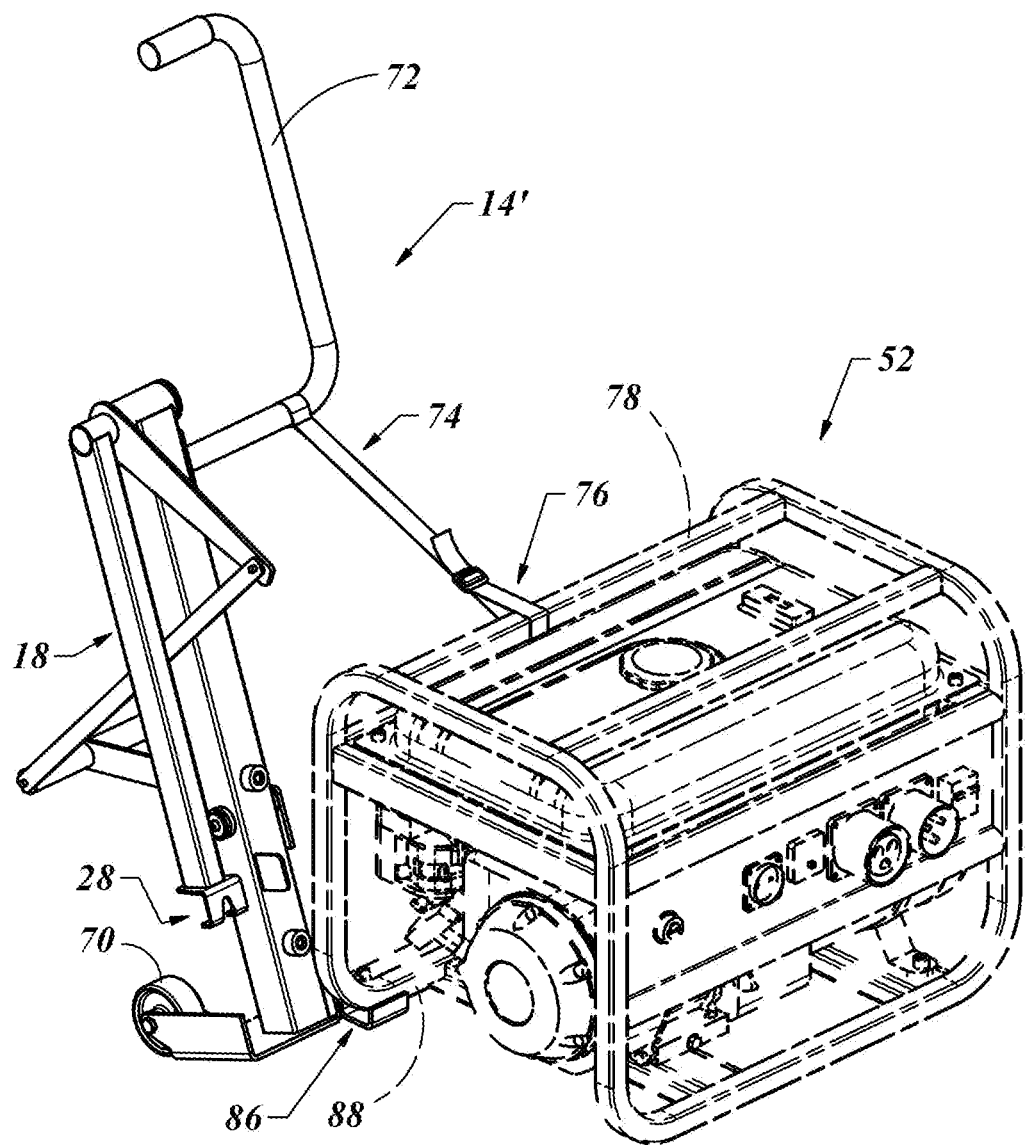
FIG. 17 is an isometric view of the pull start assist device and power tool of FIG. 15 shown from a different angle.

The relative angular displacement of the hinge plate 86 to the hinge base 80 and the use of the support strap 74 is illustrated in FIG. 15-FIG. 17. Many power tools 52, such as the portable generator shown, use a gas engine to power the tool 52. This gas engine is what is started by pulling on the pull start handle 54 of the power tool 52. These gas engines often have vented fuel systems, which may include a vented gas cap. The ability of air to flow into the tank may allow for pressure equalization and better fuel flow when the motor is running and avoid a partial vacuum in the fuel tank as the fuel volume drops. Because of this, if the engine is not positioned upright, or within a 10-15 degrees of being upright, fuel may leak out of the tank. This can be potentially dangerous as fuel is combustible.

The portable generator shown as an example of a power tool 52 is likely intended to be "portable", as it is used in the name. To transport the generator, or other power tool 52, from one place to another, the use of a wheeled cart may be desired. Two wheeled carts may be desirable in that the user may place a corner of the power tool 52 on a plate of the cart and then rotate the cart handle back to lift the power tool 52 using the leverage provided by the length, or height, of the cart. The problem may be as the cart tilts back toward the user, the power tool 52 may also tilt back and potentially spill fuel on the user or the floor.

To correct this problem, the alternative form of the pull start assist device 14' is shown in FIG. 15-FIG. 17 to be tilted back while the power tool 52 remains relatively stable in its angular orientation relative to the ground. Here it is shown that the hinge plates 86 are angularly displaced relative to the hinge bases 80. The limit to this angular displacement may be provided by the stop tabs 90 of the hinge plates 86 contacting the front flanges 82 of the hinge bases 80. Above this is shown the support strap 74, now being stretched tight between the handle arm 72 and the frame 78 of the power tool 52. This combination may allow for the power tool 52 to be lifted vertically and transported to a desired location without tilting the power tool 52. This reduces the risk of spilling fuel from the tank on the power tool 52 providing a safer form of transport.

It is understood that other embodiments of a limited range hinge plate may be used to provide a set angular displacement of the hinge plate 86 relative to the base 34'. Other forms may include a hinge plate with an axil pin, that also includes a stop to limit the angle of movement of the hinge plate 86. This may provide a single axis of rotation of the hinge plate 86 relative to the base 34'. The advantage of the interlocking hinge plate 86 and the hinge base 80 as disclosed may allow the user to easily remove the hinge plate 86 from the base 34' when it is not needed, so that the hinge plates 86 do not get in the way when the pull start assist device 14' is being used to start the engine of the power tool 52.

The foregoing detailed description of the present invention is provided for purpose of illustration, and it is not intended to be exhaustive or to limit the invention to the particular embodiment shown. The embodiments may provide different capabilities and benefits, depending on the configuration used to implement key features of the invention.

What is claimed is:

1. A pull start assist device, comprising:
   a frame including a base and a longitudinal member, the longitudinal member including a first pivot axis and a second pivot axis displaced from the first pivot axis;
   a pedal arm with a pedal on a first end and a second end pivotally coupled directly to the first pivot axis of the longitudinal member;
   a swing arm with a handle receiver on a first end and a second end pivotally coupled to the second pivot axis of the longitudinal member; and
   a connection link connecting the swing arm and the pedal arm, whereby movement of the pedal of the pedal arm of a set displacement causes a greater displacement of the handle receiver of the swing arm.

2. The pull start assist device according to claim 1, wherein the base of the frame includes a substantially flat portion suitable for a user to stand on.

3. The pull start assist device according to claim 1, further comprising a support bracket movably coupled to the base, the support bracket including a receiver notch.

4. The pull start assist device according to claim 1, further comprising a return spring coupled to the frame and the pedal arm, whereby if the pedal arm is moved, the return spring will return the pedal arm to a starting position.

5. The pull start assist device according to claim 1, wherein the pedal arm further comprises a pedal extension arm rigidly secured to the pedal arm, such that movement of the pedal arm provides a similar movement of the pedal extension arm.

6. The pull start assist device according to claim 5, wherein the connection link is coupled to the pedal extension arm of the pedal arm.

7. The pull start assist device according to claim 1, wherein the swing arm further comprises a swing extension arm rigidly secured to the swing arm, such that movement of the swing arm provides a similar movement of the swing extension arm.

8. The pull start assist device according to claim 7, wherein the connection link is coupled to the swing extension arm of the swing arm.

9. The pull start assist device according to claim 1, wherein the handle receiver includes a divided flat section with a flange on two sides of the divided flat section.

10. The pull start assist device according to claim 1, wherein the frame includes at least one wheel rotateably coupled to the base.

11. The pull start assist device according to claim 1, wherein the base of the frame further comprises at least one hinge base.

12. The pull start assist device according to claim 11, wherein the at least one hinge base includes two front flanges with an open area between the two front flanges.

13. The pull start assist device according to claim 12, further comprising a hinge plate including a stop tab, a portion of the stop tab positioned in the open area between the two front flanges and the stop tab contacting the two front flanges at a determined angular displacement of the hinge plate relative to the hinge base.

14. The pull start assist device according to claim 11, further comprising a hinge plate including a stop tab, the stop tab contacting the hinge base at a determined angular displacement of the hinge plate relative to the hinge base.

15. The pull start assist device according to claim 1, further comprising a support strap coupled to the frame.

16. The pull start assist device according to claim 15, wherein the support strap includes a first end coupled to a handle arm of the frame and a second end with a receiver, the receiver providing secured support of a frame of a power tool.

17. A pull start assist device, comprising:
   a frame including a base, the frame including a first pivot axis and a second pivot axis displaced from the first pivot axis;
   a pedal arm with a pedal on a first end and a second end pivotally coupled directly to the frame at the first pivot axis;
   a swing arm with a handle receiver on a first end and a second end pivotally coupled to the second pivot axis of the frame; and
   a connection link connecting the swing arm and the pedal arm, whereby a set displacement of the pedal of the pedal arm results in a greater displacement of the handle receiver of the swing arm.

18. The pull start assist device according to claim 17, wherein the base of the frame includes a substantially flat portion suitable for a user to stand on.

19. The pull start assist device according to claim 17, wherein the handle receiver includes a divided flat section with a flange on two sides of the divided flat section.

20. The pull start assist device according to claim 17, wherein the frame includes at least one wheel rotateably coupled to the base.

\* \* \* \* \*